United States Patent
Dabbish et al.

(10) Patent No.: US 7,734,549 B2
(45) Date of Patent: Jun. 8, 2010

(54) METHODS AND APPARATUS FOR MANAGING SECURED SOFTWARE FOR A WIRELESS DEVICE

(75) Inventors: Ezzat A. Dabbish, Cary, IL (US); Thomas Messerges, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 1449 days.

(21) Appl. No.: 10/334,849

(22) Filed: Dec. 31, 2002

(65) Prior Publication Data

US 2004/0127196 A1 Jul. 1, 2004

(51) Int. Cl.
*G06F 17/60* (2006.01)

(52) U.S. Cl. .......................... 705/59; 705/50
(58) Field of Classification Search .............. 705/59, 705/50

See application file for complete search history.

(56) References Cited

U.S. PATENT DOCUMENTS

| | | | |
|---|---|---|---|
| 6,223,291 B1 | 4/2001 | Puhl et al. | |
| 6,824,051 B2 * | 11/2004 | Reddy et al. | 235/380 |
| 6,898,706 B1 * | 5/2005 | Venkatesan et al. | 713/167 |
| 2003/0217011 A1 * | 11/2003 | Peinado et al. | 705/59 |
| 2006/0015465 A1 * | 1/2006 | Kume et al. | 705/59 |
| 2008/0098216 A1 * | 4/2008 | Scovetta | 713/165 |
| 2009/0113324 A1 * | 4/2009 | Spradling et al. | 715/764 |

FOREIGN PATENT DOCUMENTS

JP 2006135707 A * 5/2006

OTHER PUBLICATIONS

PCT Search Report; Counterpart PCT App. No. PCT/US03/39333; Motorola; Mar. 12, 2007; 4 pages.

* cited by examiner

*Primary Examiner*—Pierre E Elisca
(74) *Attorney, Agent, or Firm*—Lawrence J. Chapa

(57) ABSTRACT

A system and method to securely create, distribute, install and execute selected features of software on wireless devices combines three different types of licenses, a validation license, a digital rights management (DRM) license, and a feature license with a software application. Each of these three licenses work independent of each other, where the validation license helps prevent malicious code from executing on wireless devices, the DRM license prevents unauthorized copying of the software application and the feature license securely enables or disables specific features of the software application. The system also allows a wireless device to unwrap a DRM protected software application, to validate the software application, to enforce DRM usage rules and to execute selected features of the software application.

32 Claims, 7 Drawing Sheets

METHODS AND APPARATUS FOR MANAGING SECURED SOFTWARE FOR A WIRELESS DEVICE

TECHNICAL FIELD

The present disclosure relates to wireless communication systems, and more particularly, to software used by wireless communication devices.

BACKGROUND

Over the last decades usage of wireless devices has increased exponentially. In the mobile societies of developed countries, wireless phones are a necessity not only for busy professionals but for average consumers as well. For example, in metropolitan areas of Europe, Japan, Korea, United States and several other developed countries, wireless phones are fast replacing traditional phones as the primary means of communication. Latest models of wireless phones such as Motorola T720i, are used for not only voice communication, but also for various data communication applications, such as exchanging e-mails, photographs, surfing the Internet, etc. Other wireless communication devices such as personal data assistants (PDA) are also widely used for data communication applications mentioned above.

Such widespread usage of wireless devices has become possible due to a number of technological developments, including availability of low cost and compact memory that can be used to store large amounts of data, low cost and compact micro-processors, etc. The growth of wireless devices capable of holding larger and larger amounts of data and processing a wide variety of applications has resulted in a big demand for software that can be used on wireless devices. Typically, a user of a wireless device buys the wireless device that is loaded with a number of applications or other software by the manufacturer and/or an operator of a wireless communication service. For example, the Motorola T720i wireless phone comes with an Internet browser that is compatible with the wireless access protocol (WAP) version 1.2.1. Alternatively, a user can buy a wireless device software application at a software store and install it on a wireless device using a universal serial bus (USB) connector that allows the wireless device to communicate with a computer.

While, installing a software application on a wireless device using a USB is widely in use today, it is quite inconvenient for a user, as it requires the user to physically buy the software on a computer readable medium such as a compact disc and to connect the wireless device to a computer. This method of installing software on wireless devices is also inefficient because it does not use the wireless communication capabilities of such wireless devices. Moreover, if a software application has more than one feature, the software developer will have to design different packages with different features enabled. For example, a business software application may include a word processing feature, a spreadsheet feature and a database feature, where each combination of these features will have to be sold in different packages. Moreover, once a software package is purchased by a user, it is hard to prevent multiple unauthorized usage of the software package.

For the reasons mentioned above, it is much more advantageous to deliver software to a wireless device by using a wireless communication method. Wireless distribution of wireless device software allows a direct channel of software sales to be developed between users of wireless devices and wireless software developers. Such a sales method results in reduction of intermediary expenses such as creating and distributing software on compact discs or other media, commission costs that a software developer has to pay to a software sales store, warehousing costs for compact discs, wastage of unsold software packages, etc. Moreover, wireless distribution of software allows a developer to distribute not only software but also manuals, help guides, tutorials, etc., directly to a user as per the user's needs. For example, a software developer can remotely debug a software application distributed to a wireless device, etc.

However, such method of software delivery has to address a number of security issues to avoid unauthorized downloading of such software. For example, one may make unauthorized copies of a wireless device software application when a transmission of such wireless device software was received by a number of other wireless devices which may not have purchased such wireless device software. Alternatively, a user may download features of a software package that such a user may not have purchased. Illegal copying of software can drastically reduce potential business opportunities. Also, a software package distributed via a wireless medium may contain important business or personal information, such as a consumer's credit card number, etc., which needs to be secured against unauthorized downloading by a third person. In an extreme case, a hacker or a competitor may attack a wireless distribution network and change content of the software being distributed to the end users. These and other problems mandate that a secure distribution network be established for efficient distribution of wireless software.

BRIEF DESCRIPTION OF THE DRAWINGS

The present patent is illustrated by way of examples and not limitations in the accompanying figures, in which like references indicate similar elements, and in which.

DETAILED DESCRIPTION OF THE PREFERRED EXAMPLES

Although the following text sets forth a detailed description of numerous different embodiments of the patent, it should be understood that the legal scope of the patent is defined by the words of the claims set forth at the end of this patent. The detailed description is to be construed as exemplary only and does not describe every possible embodiment of the patent because describing every possible embodiment would be impractical, if not impossible. Numerous alternative embodiments could be implemented, using either current technology or technology developed after the filing date of this patent, which would still fall within the scope of the claims defining the patent.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
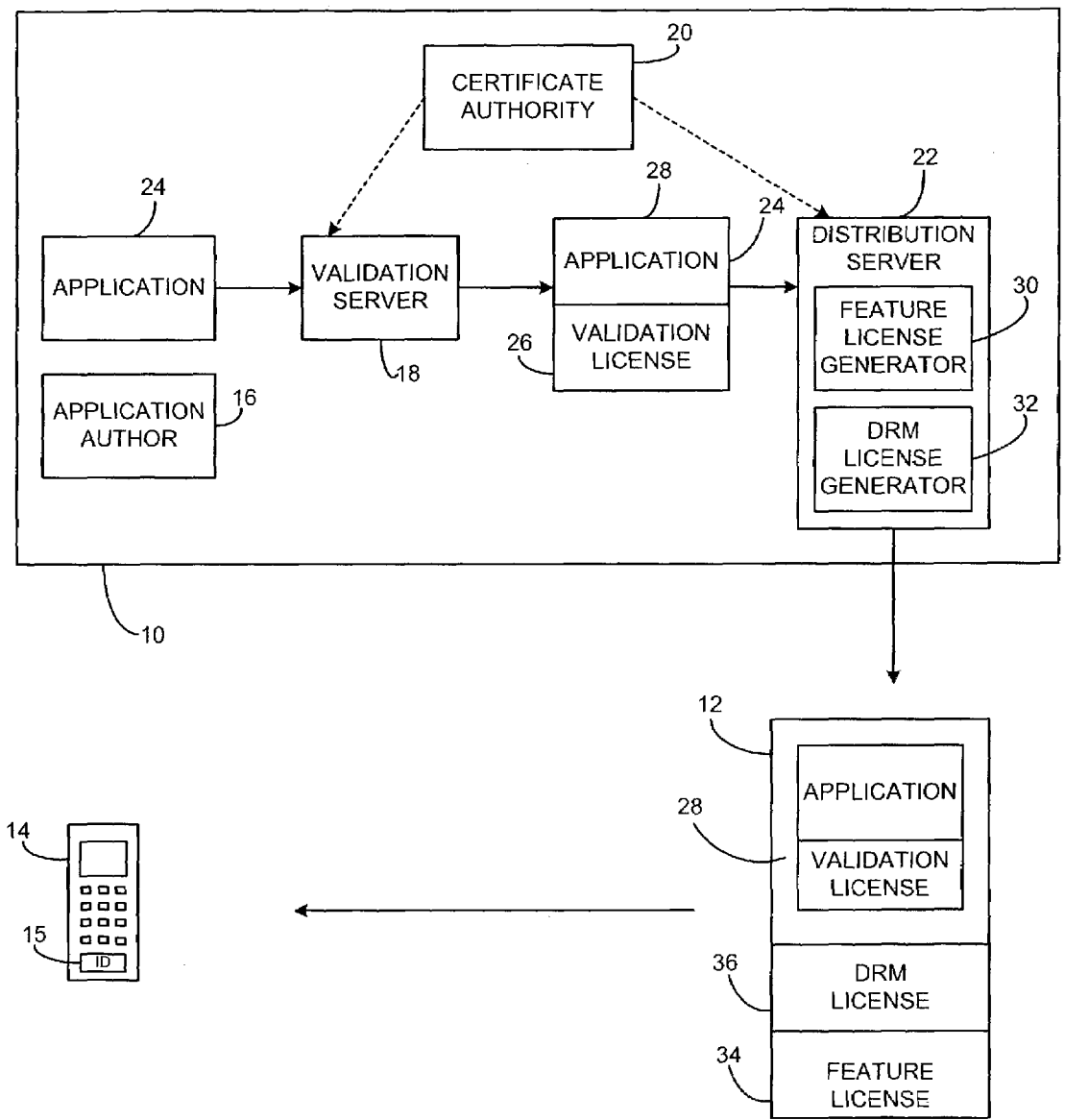
FIG. 1 illustrates an exemplary software distribution system for creating a protected software package.

FIG. 1 illustrates a simplified diagram of an example software distribution system 10 that creates a protected software package 12 that can be distributed to a wireless device 14, where the wireless device 14 is identified by a wireless device identification 15. Various components of the software distribution system 10 can be implemented either on a single computer platform or on a number of different computer platforms. Similarly, various components of the software distribution system 10 may be connected to each other via any of a number of communication methods, including by a wireless network, the Internet, etc. Moreover, some or all of the software distribution system 10 can be designed in software, hardware or firmware, and some or all of the software distribution system 10 may require human intervention at one or more place. The wireless device 14 of the exemplary system may be a wireless phone, a wireless personal data assistant (PDA), a wireless e-mail device such as Blackberry, a laptop computer equipped with wireless communication card, etc.

The exemplary software distribution system 10 includes an application author 16, a validation server 18, a certificate authority 20 and a distribution server 22. The application author 16 may be a computer programmer trained to design a software application that needs to be distributed to wireless devices such as the wireless device 14. Alternatively, the application author 16 may be an automated application development engine that is programmed to create software for wireless devices. In the illustrated example, the application author 16 creates an application 24 to be used by the wireless device 14. While in the illustrated example, the application author 16 is illustrated to be a part of the software distribution system 10, in an alternate embodiment, an entity outside the software distribution system 10, such as another company, may supply the application 24.

The application 24 may be one of a large variety of applications used by wireless devices such as the wireless device 14, such as a wireless Internet browser, a word processing system for wireless devices, a voice recognition system for wireless devices, a calendar to be used on wireless devices, etc. The application 24 may be written in any of a variety of software languages such as assembly language, JavaScript, etc. Preferably, the language used to write the application 24 complies with wireless industry standards. The application 24 may have one or more features where in some instances these features may be used independent of each other. For example, an embodiment of the application 24 may be an e-mail management software including features of contact management, calendar, etc., where a user may select to use only, for example, the calendar feature but not the contact management feature.

The validation server 18 evaluates the application 24 to ensure that it does not have any viruses or bugs that could harm either a wireless network or wireless devices intended to use the application 24, including the wireless device 14. After confirming the safety of the application 24, the validation server 18 digitally signs a validation license 26 for the application 24 using its private key. The validation server 18 binds the validation license 26 to application 24 by including a cryptographic hash of application 24 in the validation license 26, which was signed. Subsequently, the validation server 18 creates a first package 28 of the application 24 and the validation license 26.

The validation server has a public key that corresponds to the private key used to sign validation license 26. This public key is included in a digital certificate that the validation server 18 receives from certificate authority 20. This digital certificate is available to wireless devices that need to check the signature of the validation license 26. Thus, it is ensured that when the application 24 and validation license 26 are transmitted over a wireless network, a wireless device, such as the wireless device 14 receiving the application, is able to authenticate the validation license 26 created by the validation server 18. The certificate authority 20 may use any of a number of commercially available security systems that enable users of a basically un-secure public network such as the Internet to securely and privately exchange data through the use of a public and a private cryptographic key pair that is obtained and shared through a trusted authority, such as a public key infrastructure (PKI), etc. A number of vendors including Verisign, Inc., Xcert International, Inc., etc., can be used as the certificate authority 20. Even though this embodiment uses a public-key (PK) system, a person skilled in the art could develop a symmetric key based equivalent.

The first package 28 is transmitted to the distribution server 22. The distribution server 22 includes a feature license generator 30 and a digital rights management (DRM) license generator 32. The feature license generator 30 generates a feature license for a particular feature of the application 24. For example, if the application 24 is an e-mail management software including features of contact management, calendar, etc., and if a user of the wireless device 14 selects to use only, for example, the calendar feature but not the contact management feature, the feature license generator 30 creates a feature license 34 for the calendar feature. Such a feature license 34 grants the wireless device 14 a right to use the calendar feature. The feature license 34 may identify the wireless device 14 by the device identification 15, a public key (e.g., from a certificate issued to device 14), or a combination of the device identification 15 and the public key, etc. The distribution server 22 digitally signs the feature license 30 to ensure that the recipient of this license can verify its integrity and authenticity.

The DRM license generator 32 generates a DRM license 36 that grants a particular device, for example, the wireless device 14, rights to access the application 24. The DRM license 36 may use the device identification 15 of the wireless device 14 to grant such rights. Identifying a device by a device identification ensures that if the application 24 were copied to a device other than the one whose device identification is contained in the DRM license 36, such alternate device will not activate the application 24. In addition, the DRM license 36 may also contain additional usage rules for the application 24. For example, the DRM license 36 may contain a rule that the wireless device 14 is allowed to use the application 24 for only a specified period of time, or up to a specified amount of data, etc. A digital signature generated by distribution server 22 protects the integrity and authenticity of digital license 36.

The distribution server 22 combines the first package 28 with the digitally signed feature license 34 and the DRM license 36 to create the protected software package 12. Such a protected software package 12 may be transmitted to a device, such as the wireless device 14, using any of the commonly used communication media. For example, the distribution server 22 may transmit the protected software package 12 to the wireless device 14 using a wireless network, via the Internet, via a secured virtual private network (VPN) or any combination of such communication media.

Figure 2:
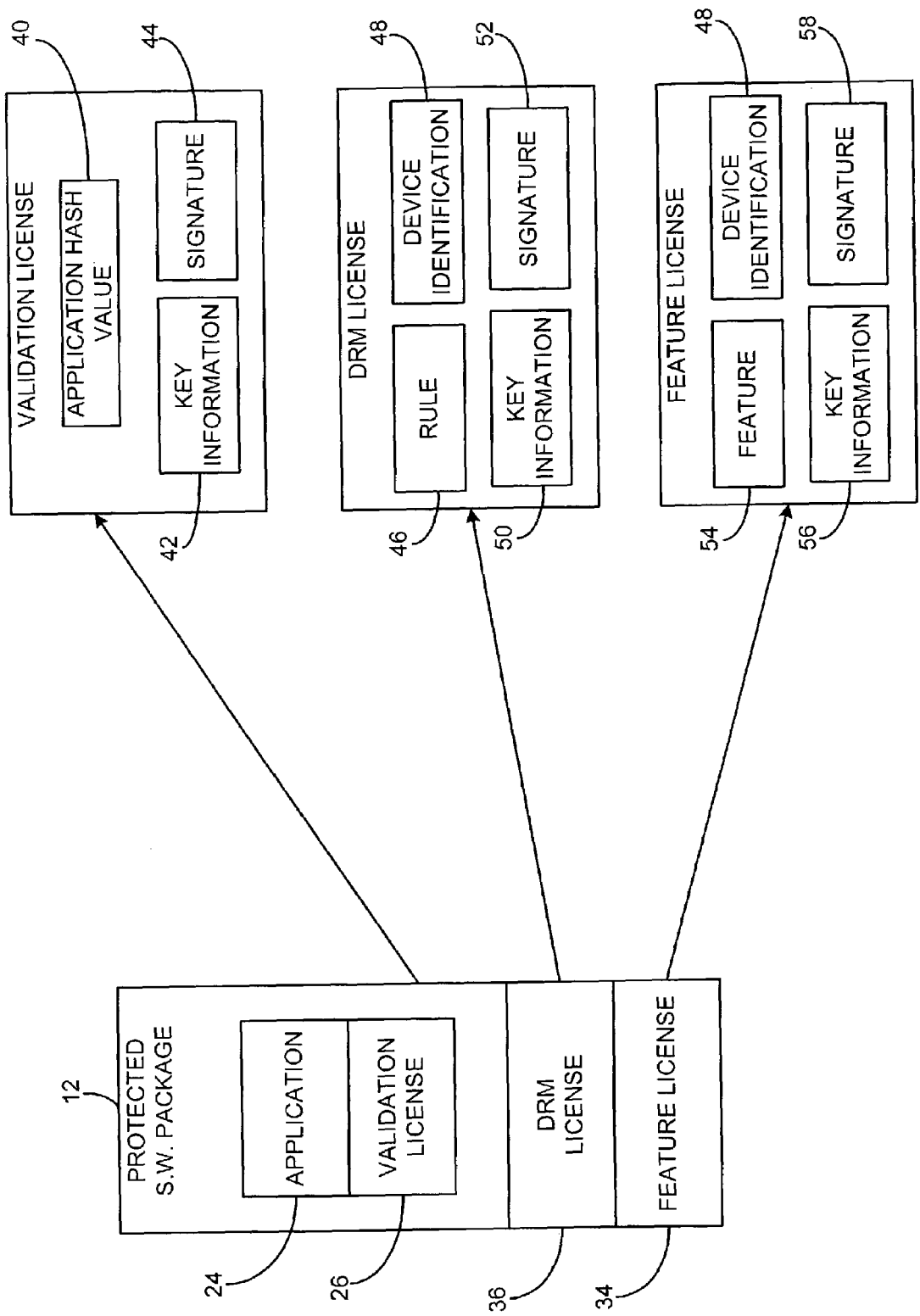
FIG. 2 illustrates an exemplary protected software package.

FIG. 2 shows an exemplary structure of the protected software package 12. As shown in FIG. 2, the protected software package 12 includes the application 24, the validation license 26, the feature license 34 and the DRM license 36. As shown in FIG. 2, the validation license 26 includes a first application hash value 40, a validation key information 42 and a validation signature 44. The DRM license 36 includes a set of rules 46, a device identification 48, a DRM key information 50 and a DRM signature 52. Similarly, the feature license 34 includes a list of features 54, the device identification 48, a feature key information 56 and a feature signature 58.

The first application hash value 40 contained in the validation license 26 may be computed by the validation server 18 by using any of a number of cryptographic hash algorithms, such as the Secure Hash Algorithm 1 (SHA-1), the Secure Hash Algorithm 256 (SHA-256), the Message Digest 5 (MD5), etc. The first application hash value 40 allows a device receiving the application 24 to ensure that the application 24 is received in complete and in the correct form. The device receiving the application 24 may also have a program that allows it to calculate a second application hash value for the received application 24 and to compare the second hash value with the first hash value 40. If these two application hash values match, it confirms that the application 24 is received in a complete and correct form. For example, if a part of the application 24 is lost in the transmission from the distribution server 22 to the wireless device 14 such that the wireless device 14 does not receive the complete application 24 or an adversary tried to hide a virus in the application 24, the second application hash value calculated by the wireless device 14 will not match the first application hash value 40. In this case, the wireless device 14 may notify the distribution server 22 that the application 24 was not received correctly.

The validation key information 42 contained in the validation license 26 may be in the form of a public-key certificate, key data, or a name of a particular key. If the validation server 18 uses a public-key infrastructure (PKI) to ensure the security of the first package 28, the validation key information 42 may be a public-key certificate that contains the public key that will enable a device receiving the protected software package 12 to verify the validation signature 44. Certificate authority 20 digitally signs this public-key certificate. A device receiving the protected software package 12 will only authenticate the validation signature 44 using a public key extracted from a certificate whose signature from the certificate authority 20 can be verified. Instead of a certificate, the public-key itself may be used as key information 42. In this case, a device receiving the protected software package 12 should have this public key preinstalled (e.g., a root key). If this preinstalled public key matches the public key used as key information 42, the device receiving the protected software package 12 will know to use this public key to verify the validation signature 44. Alternatively, if merely a name of a particular key is used as the key information 42, a device receiving the protected software package 12 should use the key identified by the name of the particular key to verify the validation signature 44.

The set of rules 46 contained in the DRM license helps the wireless device 14 to control usage of the application 24. For example, one usage rule may be billing a user's credit card or an account at a periodic interval and at a predetermined rate defined in that usage rule based on the amount of time the application 24 was used. Another usage rule may be that the application 24 is to be rendered inactive after a certain predetermined time, unless the wireless device 14 gets another certificate allowing it to keep the application 24 active. The DRM license may be any format, for example an industry-standard format, such as the DRM specification being developed by motion pictures experts group (MPEG-21) or an Open Mobile Alliance (OMA) format, may be used.

The device identification 48 contained in the DRM license 36 allows the DRM license 36 to identify a device on which the application 24 may be activated. For example, if a user of a first device downloads the protected software package 12 on the first device and if the device identification of that first device matches the device identification 48 as specified in the DRM license 36, that first device may install the application 24 on the first device. However, if the protected software package 12 is copied from the first device to a second device, the device identification of the second device will not match the device identification 48 on the DRM license 36 contained in the protected software package 12, therefore the second device will not install and use the application 24. Alternatively, the device identification 48 contained on the DRM license may be a group identification such that it will allow a group of devices to be able to install and use the application 24. Such group identification as the device identification 48 allows the application 24 to be sold to, for example, a corporation where each employee has a device that may be able to use the application 24.

The DRM key information 50 contained in the DRM license 36 is used by a device to verify the DRM signature 52 and authenticate usage rights granted by the DRM license 36. The DRM key information 50 may be in the form of a public-key certificate, key data, or a name of a particular key. The distribution server 22 may obtain, from certificate authority 20, a public-key certificate that contains the public key that will enable a device receiving the protected software package 12 to verify the DRM signature 52. For example, once a user of the wireless device 14 buys the application 24, the distribution server 22 creates a DRM license for that user and the distribution server 22 uses its private key to create DRM signature 52. When the wireless device 14 receives the protected software package 12, it uses the DRM key information 50 (e.g., the public key contained in the public-key certificate signed by the certificate authority 20) to verify the DRM signature 52. Once the DRM signature 52 is verified, the wireless device 14 is assured that contents of the protected software package 12 are not modified and are authentic, for example, the DRM usage rules 46 contained in the DRM license 36 originated from distribution server 22.

The list of features 54 contained in the feature license 34 lists various features of the application 24 that a device is to have access to. For example, if a user of the wireless device 14 has purchased only features A and B, while the application 24 contains features A, B and C, the list of features 54 will contain only A and B. The feature license 34 also contains the device identification 48, which will identify the wireless device 14 which should have access to features A and B of the application 24. The feature key information 56 and the feature signature 58 operate in a fashion similar to the DRM key information 50 and DRM signature 52 of the DRM license 36, except that in the case of the feature license 34, the feature key information 56 allows the wireless device 14 identified by the device identification 48 to verify the feature signature 58, and to subsequently authenticate the features of the application 24 that are listed in the list of features 54, thereby ensuring that only these features will be allowed. It should be noted that in an alternate embodiment, the protected software package 12 could contain a separate feature license for each feature of application 24 that should be activated. So, instead of listing features A and B in the same feature license 34, two separate feature licenses 34 could be issued, one with feature A and the other with feature B.

Figure 3:
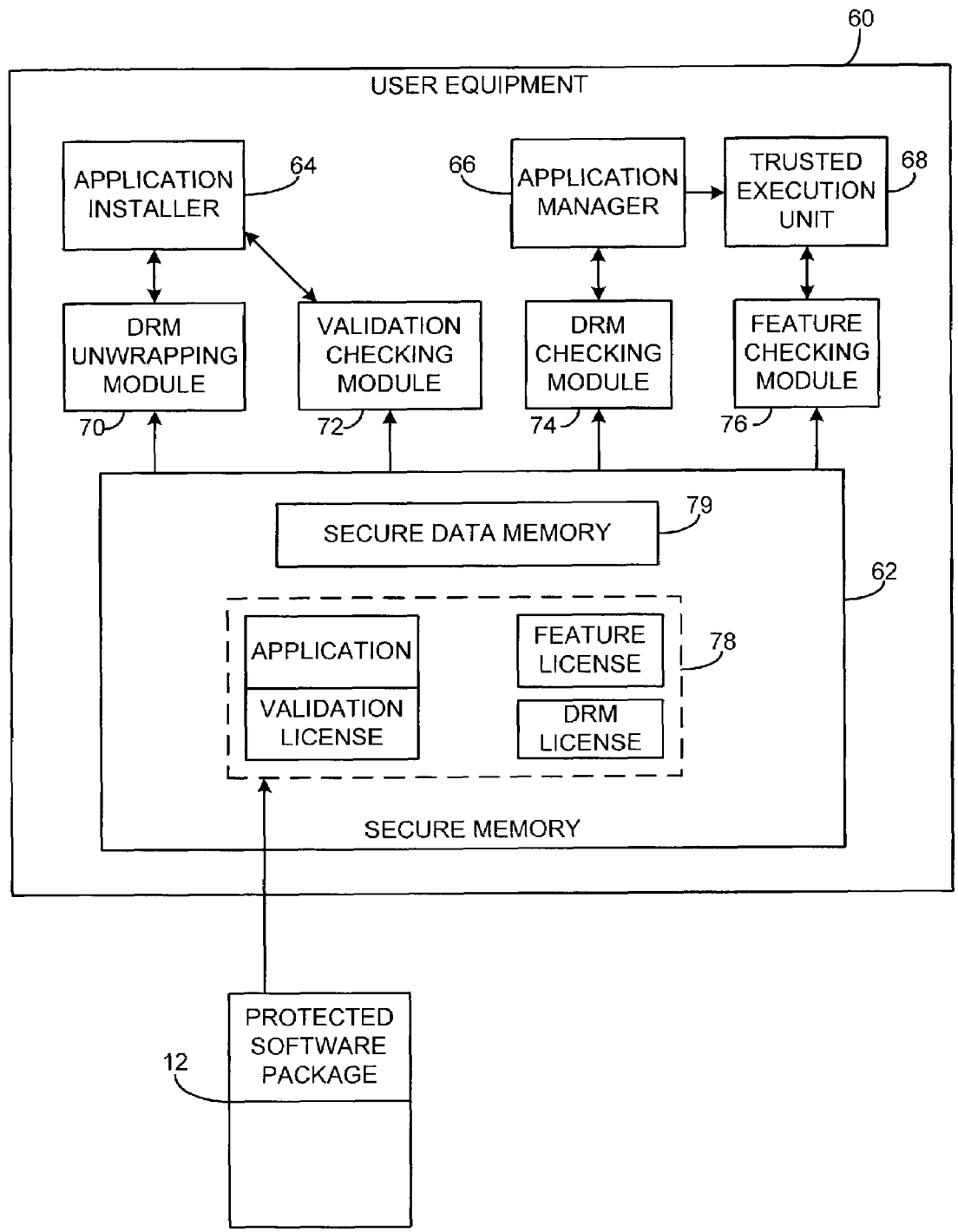
FIG. 3 illustrates an exemplary user equipment system that installs and executes the protected software package.

FIG. 3 shows an exemplary design of a user equipment (UE) system 60 that installs the protected software package 12 and executes the application 24 on a device such as the wireless device 14. The UE system 60 includes a memory 62, an application installer 64, an application manager 66, a trusted execution unit 68, a DRM unwrapping module 70, a validation checking module 72, a DRM checking module 74, and a feature checking module 76. The functioning of various modules illustrated in FIG. 3 is further described below using a flowchart 80 of FIG. 4.

The memory 62 may be a secured memory located on the wireless device 14 such that only the wireless device 14 identified by a device identification 15 may be able to access any information stored in the memory 62. A part of the memory 62, such as the first part of the memory 78, may be used to store various components of the protected software package 12, after the protected software package 12 is received by the wireless device 14. Similarly, a second part of the memory 79, may be used to store information used by the UE system 60 to verify various licenses, such as device identification 15, a validation verify key received from a PKI, a DRM verification key received from a PKI, a feature verification key received from a PKI, etc.

It should be appreciated that the various modules 64-76 of the UE system 60 as shown in FIG. 3 may be implemented using firmware, hardware or software, where such a software application is stored in the memory 62. For example, in one implementation of the UE system 60, the modules 64-76 are implemented using a software application in the memory 62. In such an implementation of the UE system 60, the wireless device 14 may be purchased with such software to implement the modules 64-76. Alternatively, such software for implementing the modules 64-76 may also be downloaded by the wireless device 14 over any of various communication media such as the Internet, a wireless communication system, etc.

Figure 4:
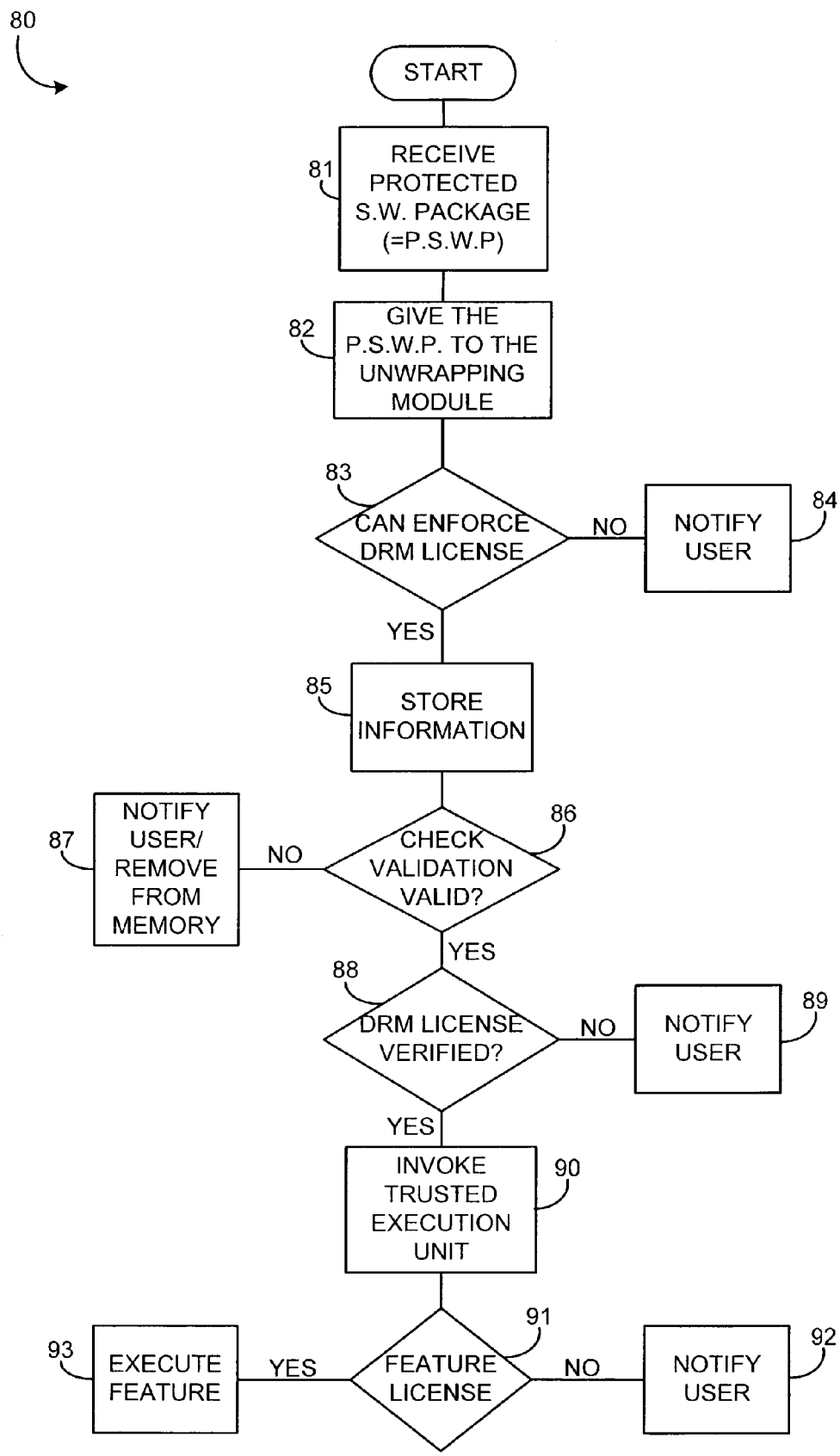
FIG. 4 illustrates an exemplary flowchart of a functioning of the user equipment system.

Now turning to FIG. 4, the flowchart 80 illustrates an exemplary functioning of various modules of the UE system 60 to install the protected software package 12 and to execute the application 24 on the wireless device 14.

At a block 81 the wireless device 14 receives the protected software package 12 from the distribution server 22.

At a block 82 the application installer 62 gives the protected software package 14 to the DRM unwrapping module 70. Next, at a block 83, the unwrapping module 70 enforces the DRM protection for installing the software application 24 into the wireless device 14. For example, unwrapping module 70 verifies that the DRM license signature 52 is valid, that device identification 15 of the wireless device 14 matches the device identification 48, and that the set of rules 46 allow the application 24 to be installed into the wireless device 14. As noted above, the wireless device 14 may receive the key information 50 to assist in the verification of the DRM signature 52.

If, at block 83, the unwrapping module 70 determines that the DRM protection cannot be enforced (e.g., the DRM license signature is not valid, the device identification 15 does not match the device identification 48, or the set of rules 46 do not allow installation), at block 84 the application installer 62 will notify the user of the wireless device 14 that it is not authorized to install the protected software package 14.

After un-wrapping the DRM protection, at a block 85 the application installer 62 stores various components of the protected software package 14, such as the application 24, the validation license 26, the feature license 34, the DRM license 36, etc., on the memory 62.

At a block 86 the validation checking module 72 checks the validation license 26 contained in the secured software package 12. This check involves verification of the validation signature 44. As noted above, wireless device 14 may use a validation verification key and the validation key information 42 to verify the validation signature 44. The wireless device 14 may have received such a validation verification key from the certificate authority 20. The validation checking module 72 verifies the validation signature 44 and if not valid, at a block 87 the validation checking module removes the various components of the secured software package 12 from the memory 62 and notifies the user of the wireless device 14.

If the validation license 26 is good (e.g., the validation signature 44 was verified), at a block 88 the application manager 66 invokes the DRM checking module 74 to verify that the wireless device 14 has the rights to execute the application 24. The DRM checking module 74 uses the DRM usage rules 46, the device identification 48, the DRM key information 50, the DRM signature 52 and a DRM verification key to verify that the wireless device 14 has the rights to execute the application 24, where the DRM verification key may be received from the certificate authority 20. If the wireless device 14 does not have the rights to execute the application 24, at a block 89, the application manager 66 notifies the user of the wireless device 14.

If the wireless device 14 is found to have the rights to execute the application 24, at a block 90, the application manger 66 invokes the trusted execution unit 68 to execute the application 24.

At a block 91, the trusted execution unit 68 checks to see which features of the list of features 54 are enabled. The trusted execution unit 68 uses the device identification 48, the feature key information 56, the feature signature 58 and a feature verification key to verify which features of the application 24 can be executed on the wireless device 14, where the feature verification key may be received from the certificate authority 20. The trusted execution unit 68 may receive instructions from a user of the wireless device 14 to execute a particular feature, however, if the wireless device 14 is not authorized to execute such a feature selected by the user, at a block 92, the trusted execution unit 68 notifies the user, otherwise at a block 93, the trusted execution unit 68 executes the feature selected by the user on the wireless device 14.

Figure 5:
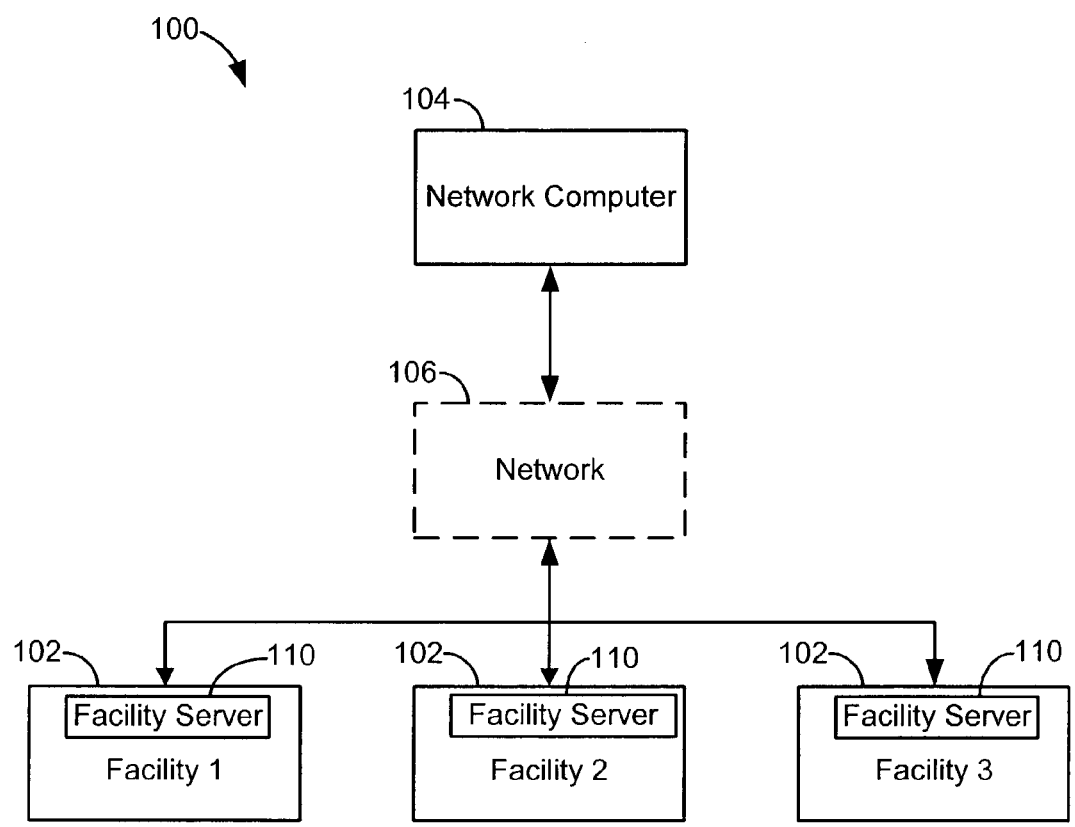
FIG. 5 illustrates an exemplary data network including a group of software distribution systems.

FIG. 5 illustrates a data network 100 including a first group of software distribution facilities 102 adapted to implement the software distribution system 10. Specifically, FIG. 5 illustrates an embodiment of a data network 100 including a first group of software distribution facilities 102 operatively coupled to a network computer 104 via a network 106. The plurality of software distribution facilities 102 may be located, by way of example rather than limitation, in separate geographic locations from each other, in different areas of the same city, or in different states. The network 106 may be provided using a wide variety of techniques well known to those skilled in the art for the transfer of electronic data. For example, the network 106 may comprise dedicated access lines, plain ordinary telephone lines, satellite links, combinations of these, etc. Additionally, the network 106 may include a plurality of network computers or server computers (not shown), each of which may be operatively interconnected in a known manner. Where the network 106 comprises the Internet, data communication may take place over the network 106 via an Internet communication protocol.

The network computer 104 may be a server computer of the type commonly employed in networking solutions. The network computer 104 may be used to accumulate, analyze, and download data relating to the distribution facility 102's software applications, licenses, etc. For example, the network computer 104 may periodically receive data from each of the software distribution facilities 102 indicative of information pertaining to a software application, a wireless device identification, etc. The software distribution facilities 102 may include one or more facility servers 110 that may be utilized to store information for a plurality of software application/licenses/wireless devices/etc. associated with each distribution facility 102.

Although the data network 100 is shown to include one network computer 104 and three software distribution facilities 102, it is understood tat different numbers of computers and distribution facilities may be utilized. For example, the network 100 may include a plurality of network computers 104 and dozens of distribution facilities 102, all of which may be interconnected via the network 106. According to the disclosed example, this configuration may provide several advantages, such as, for example, enabling near real time uploads and downloads of information as well as periodic uploads and downloads of information. This provides for a primary backup of all the information generated in the process of updating and accumulating software applications, licenses, etc., used by various distribution facilities.

Figure 6:
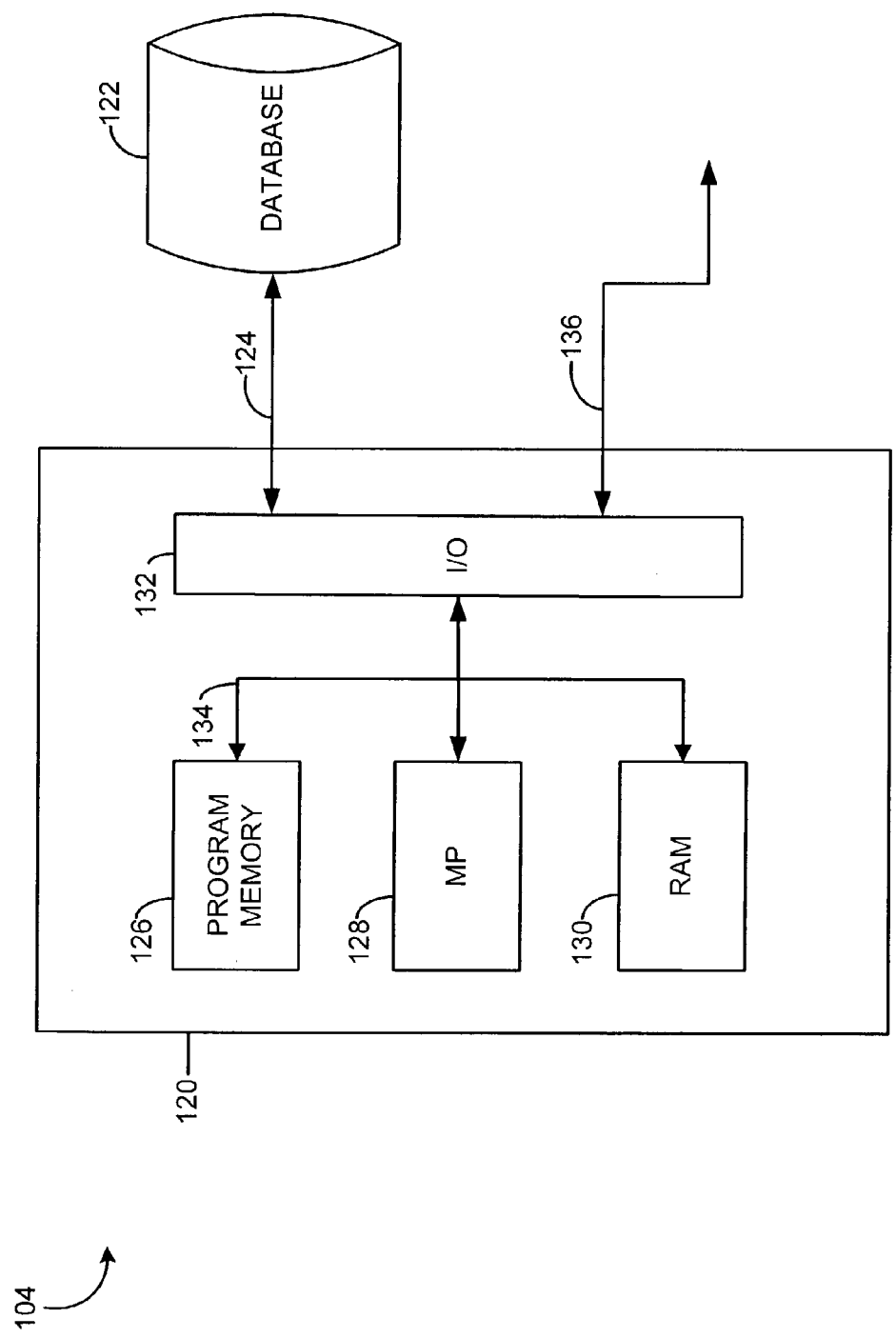
FIG. 6 illustrates a schematic diagram of an exemplary embodiment of a network computer used in the data network.

FIG. 6 is a schematic diagram of one possible embodiment of the network computer 104 shown in FIG. 5. The network computer 104 may have a controller 120 that is operatively connected to a database 122 via a link 124. It should be noted that, while not shown, additional databases may be linked to the controller 120 in a known manner.

The controller 120 may include a program memory 126, a microcontroller or a microprocessor (MP) 128, a random-access memory (RAM) 130, and an input/output (I/O) circuit 132, all of which may be interconnected via an address/data bus 134. It should be appreciated that although only one microprocessor 128 is shown, the controller 120 may include multiple microprocessors 128. Similarly, the memory of the controller 120 may include multiple RAMs 130 and multiple program memories 126. Although the I/O circuit 132 is shown as a single block, it should be appreciated that the I/O circuit 132 may include a number of different types of I/O circuits. The RAM(s) 130 and program memories 126 may be implemented as semiconductor memories, magnetically readable memories, and/or optically readable memories, for example. The controller 120 may also be operatively connected to the network 106 via a link 136.

Figure 7:
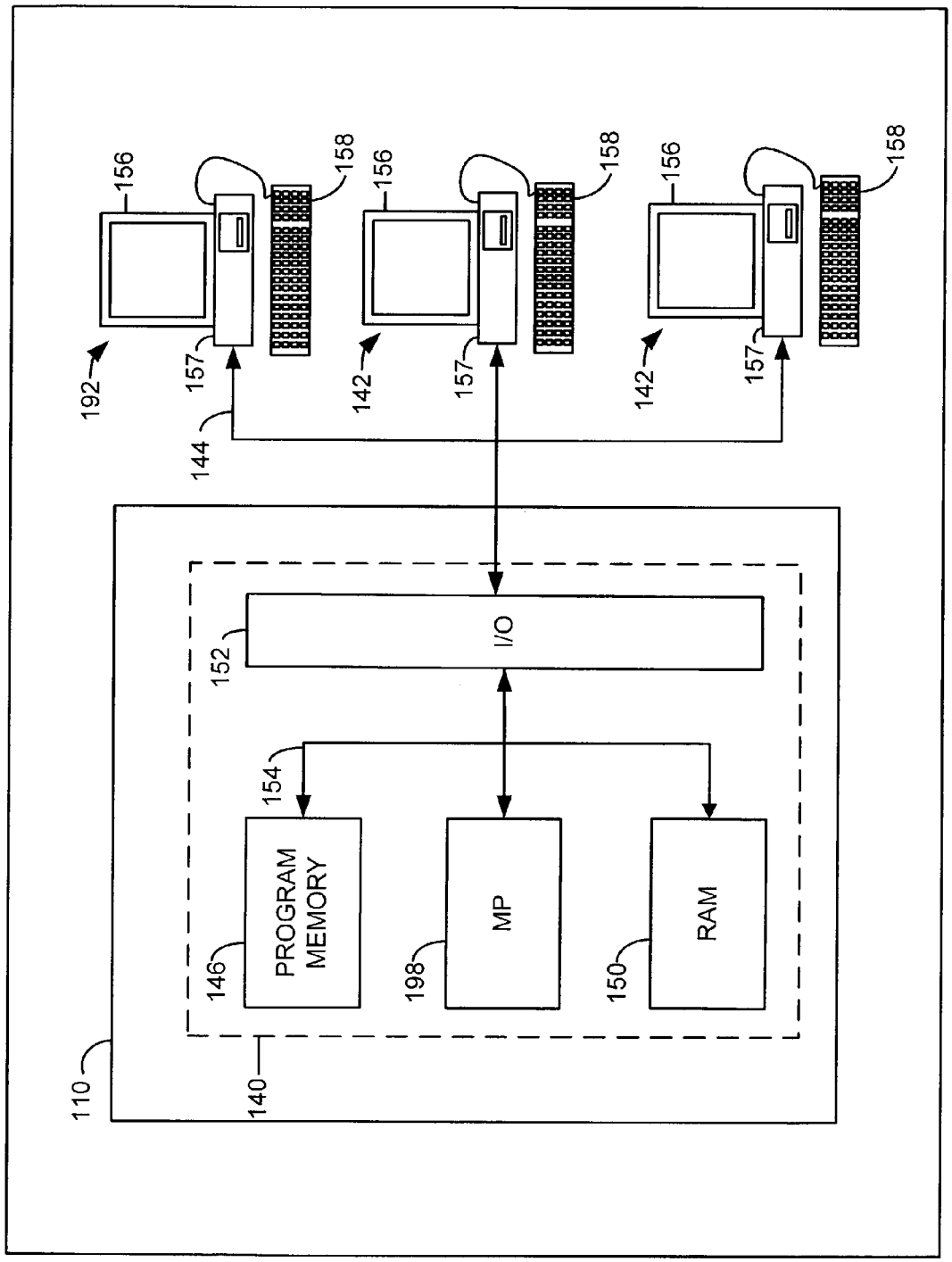
FIG. 7 illustrates a schematic diagram of an exemplary embodiment of a software distribution system.

FIG. 7 is a schematic diagram of one possible embodiment of several components located in one or more of the software distribution facilities 102 from FIG. 5. Although the following description addresses the design of the software distribution facilities 102, it should be understood that the design of one or more of the software distribution facilities 102 may be different than the design of other software distribution facilities 102. Also, each distribution facility 102 may have various different structures and methods of operation. It should also be understood that the embodiment shown in FIG. 7 illustrates some of the components and data connections present in a distribution facility, however it does not illustrate all of the data connections present in a typical distribution facility.

For exemplary purposes, one design of a distribution facility is described below, but it should be understood that numerous other designs may be utilized.

The software distribution facilities 102 may have a facility server 110, which includes a controller 140, wherein the facility server 110 is operatively connected to a plurality of client device terminals 142 via a network 144. The network 144 may be a wide area network (WAN), a local area network (LAN), or any other type of network readily known to those persons skilled in the art. The client device terminals 142 may also be operatively connected to the network computer 104 from FIG. 5 via the network 106.

Similar to the controller 120 from FIG. 6, the controller 140 may include a program memory 146, a microcontroller or a microprocessor (MP) 148, a random-access memory (RAM) 150, and an input/output (I/O) circuit 152, all of which may be interconnected via an address/data bus 154. As discussed with reference to the controller 120, it should be appreciated that although only one microprocessor 148 is shown, the controller 140 may include multiple microprocessors 148. Similarly, the memory of the controller 140 may include multiple RAMs 150 and multiple programs memories 146. Although the I/O circuit 152 is shown as a single block, the I/O circuit 152 may include a number of different types of I/O circuits. The RAM(s) 150 and programs memories 146 may also be implemented as semiconductor memories, magnetically readable memories, and/or optically readable memories, for example.

The client device terminals 142 may include a display 156, a controller 157, a keyboard 158 as well as a variety of other input/output devices (not shown) such as a printer, mouse, touch screen, track pad, track ball, isopoint, voice recognition system, etc. Each client device terminal 142 may be signed onto and occupied by a distribution facility employee to assist them in performing their duties, or by application authors 16 to upload application 24 onto the software distribution system 10. Distribution facility employees may sign onto a client device terminal 142 using any generically available technique, such as entering a user name and password. If a distribution facility employee is required to sign onto a client device terminal 142, this information may be passed via the link 144 to the facility server 110, so that the controller 140 will be able to identify which distribution facility employees are signed onto the system and which client device terminals 142 the employees are signed onto.

Typically, facility servers 110 store a plurality of files, programs, and other data for use by the client device terminals 142 and the network computer 104. One facility server 110 may handle requests for data from a large number of client device terminals 142. Accordingly, each facility server 110 may typically comprise a high-end computer with a large storage capacity, one or more fast microprocessors, and one or more high-speed network connections. This will allow the facility server 110 to communicate with certificate authorities 20 on behalf of a number of application authors 16 working at the various client device terminals 142. Conversely, relative to a typical facility server 110, each client device terminal 142 may typically include less storage capacity, a single microprocessor, and a single network connection.

Although the software distribution system 10, as described herein, is preferably implemented in software, it may be implemented in hardware, firmware, etc., and may be implemented by any other processor associated with the software distribution facilities 102. Thus, the routine(s) described herein may be implemented in a standard multi-purpose CPU or on specifically designed hardware or firmware as desired. When implemented in software, the software routine(s) may be stored in any computer readable memory such as on a magnetic disk, a laser disk, or other storage medium, in a RAM or ROM of a computer or processor, etc. Likewise, the software may be delivered to a user or process control system via any known or desired delivery method including, for example, on a computer readable disk or other transportable computer storage mechanism or over a communication channel such as a telephone line, the Internet, etc. (which are viewed as being the same as or interchangeable with providing such software via transportable storage medium).

In the foregoing specification the present patent has been described with reference to specific embodiments. However, one of ordinary skill in the art will appreciate that various modifications and changes can be made to these embodiments without departing from the scope of the present patent as set forth in the claims below. Accordingly, the specification and figures are to be regarded in an illustrative rather than in a restrictive sense, and all such modifications are intended to be included within the scope of the present patent.

What is claimed is:

1. A method of managing software for a wireless device, where the protected software package includes a software application having a plurality of features, which are separately executable, a validation license, a digital rights management (DRM) license and a feature license, the method comprising:
    creating the software application;
    creating the validation license;
    creating a first combination of the validation license with the software application;
    protecting the first combination using a DRM scheme;
    creating the DRM license for the DRM-protected first combination;
    creating the feature license, which authorizes execution of a predefined subset of the plurality of features; and
    creating a protected software package of the DRM-protected first combination, the DRM license and the feature license.

2. A method as described in claim 1, wherein creating the validation license includes verifying the software application for a software bug or a software virus.

3. A method as described in claim 2, wherein creating the DRM license includes granting a first device a right to access the software application, where the first device is identified by one of a device identification, a certificate and a public key.

4. A method as described in claim 3, wherein the plurality of features includes at least a first feature and wherein creating the feature license includes granting the first device a right to access a first feature of the software application.

5. A method as described in claim 4, further comprising:
    installing the software application on the first device;
    presenting a list of features from the software application to a user; and
    executing the first feature on the first device.

6. A method of claim 4, further comprising:
    receiving the protected software package on the first device;
    verifying the DRM license using a DRM verification key;
    enforcing the DRM license rule for installing the protected software package;
    unwrapping the DRM license, the feature license and the validation license from the protected software package;
    storing the DRM license, the feature license, the validation license and the software application on the first device; and
    verifying the feature license using a feature verification key.

7. A method of claim 6, further comprising verifying the validation license.

8. A method of claim 6, further comprising enforcing a DRM license.

9. A method of claim 6, wherein the DRM license rule is enforced using one of (1) the device identification, (2) a DRM license signature, (3) a set of rules in the DRM license.

10. A method of claim 6, further including removing the DRM license, the feature license, the validation license and the software application from the first device if the validation license is bad.

11. A method of claim 6, further including executing the first feature on the first device if the feature license authorizes the first device to execute the first feature.

12. A method of claim 6, wherein the first device receives the protected software package over a wireless communication medium.

13. A system for managing distribution of a software application having a plurality of features, the system comprising:
    an application generator adapted to create the software application;
    a validation server adapted to create a validation license; and
    a distribution server adapted to (1) create a first combination of the validation license and the software application, (2) protecting the first combination, (3) create a digital rights management (DRM) license for the encrypted first combination, (4) create a feature license, which authorizes execution of a predefined subset of the plurality of features of the software application, and (5) create a protected software package as a combination of the encrypted first combination, the DRM license and the feature license.

14. A system as described in claim 13, wherein the validation server is further adapted to create the validation license after verifying the software application for a software bug or a software virus.

15. A system as described in claim 14, wherein the distribution server is further adapted to create the DRM license by granting a first device a right to access the software application, where the first device is identified by one of a device identification, a certificate and a public key.

16. A system as described in claim 15, wherein the plurality of features includes at least a first feature and wherein the distribution server is further adapted to create the feature license by granting the first device a right to access a first feature of the software application.

17. A system as described in claim 16, further comprising:
    an application installer adapted to install the protected software package on the first device;
    an application manager adapted to present the software application to a user; and
    an execution unit adapted to execute the first feature of the software application.

18. A system as described in claim 17, wherein the application installer is further adapted to (1) receive the protected software package on the first device, (2) verify a DRM license using a DRM verification key, (3) enforce a DRM license rule for installing the software package; (4) unwrap the DRM license, the feature license and the validation license from the protected software package, (5) store the DRM license, the feature license, the validation license and the software application, (6) verify integrity and authenticity of the feature license using a feature verification key.

19. A system as described in claim 18, wherein the application installer is further adapted to verify the validation license using a validation verification key.

20. A system as described in claim 19, further adapted to remove the DRM license, the feature license, the validation license and the software application from the first device if the validation license is bad.

21. A system as described in claim 18, wherein the application installer is further adapted to enforce a DRM license rule for executing the software package.

22. A system as described in claim 21, wherein the execution unit is further adapted to execute the first feature on the first device if the feature license authorizes the first device to execute the first feature.

23. A system as described in claim 18, further adapted to enforce the DRM license rule using one of (1) the device identification, (2) the DRM license signature, and (3) a set of rules in the DRM license.

24. A system as described in claim 21, wherein the first device receives the protected software package over a wireless communication medium.

25. A protected software package for use on a first device comprising:
    a software application to be executed on the first device containing multiple separately accessible sets of features including at least a first set of features;
    a validation license to verify integrity of the software application;
    a digital rights management (DRM) license to grant the first device a first set of rights to execute and install the software application; and
    a feature license granting the first device a second set of rights to execute the first set of features.

26. A protected software package as described in claim 25, wherein the validation license comprises:
    an application hash value to verify the integrity and authenticity of the software application; and
    a combination of a validation key information and a validation signature to verify the validation license.

27. A protected software package as described in claim 25, wherein the DRM license comprises:
    a set of DRM rules specifying the first set of rights;
    a device identification specifying the first device; and
    a combination of DRM key information and a DRM signature to verify the DRM license.

28. A protected software package as described in claim 25, wherein the feature license comprises:
    a list of features which can be executed on the first device;
    a device identification specifying the first device; and
    a combination of feature key information and a feature signature to verify the feature license.

29. A user equipment to be used in a first device to receive a protected software package containing a software application having a plurality of features, which are separately executable, a validation license, a digital rights management (DRM) license and a feature license, which authorizes execution of a predefined subset of the plurality of features, the user equipment comprising:
    an application installer adapted to install the protected software package on the first device;
    an application manager adapted to present the software application to a user; and
    an execution unit adapted to execute the features of the software application including a first feature from the predefined subset of the plurality of features, which are authorized for execution.

30. A user equipment as described in claim 29 further comprising:
    a validation checking module to verify the validation license;
    a DRM unwrapping module to enforce a first set of rules from the DRM license;
    a DRM checking module to verify that the first device has a right to execute the software application; and
    a feature checking module to verify that the first device has a right to execute the first feature of the software application.

31. For use with a first device having a protected software package containing a software application having a plurality of features, which are separately executable, a validation license, a digital rights management (DRM) license and a feature license, which authorizes execution of a predefined subset of the plurality of features, a computer program embodied in at least one computer readable medium comprising:
    first software for validating the validation license using a validation key information and a validation signature;
    second software for enforcing a first set of rules from the DRM license using a DRM key information and a DRM signature;
    third software for verifying that the first device has a right to execute the software application; and
    fourth software to verify that the first device has a right to execute a first feature of the software application.

32. A computer program as described in claim 31, further comprising a fifth software to remove the protected software package from a memory of the first device if the first device does not have a right to execute the software application.

* * * * *